Nov. 18, 1941.                E. W. CLEXTON                2,262,756
      SAFETY DEVICE FOR USE ON AIRCRAFT EMPLOYING RETRACTABLE LANDING GEAR
                           Filed May 8, 1940
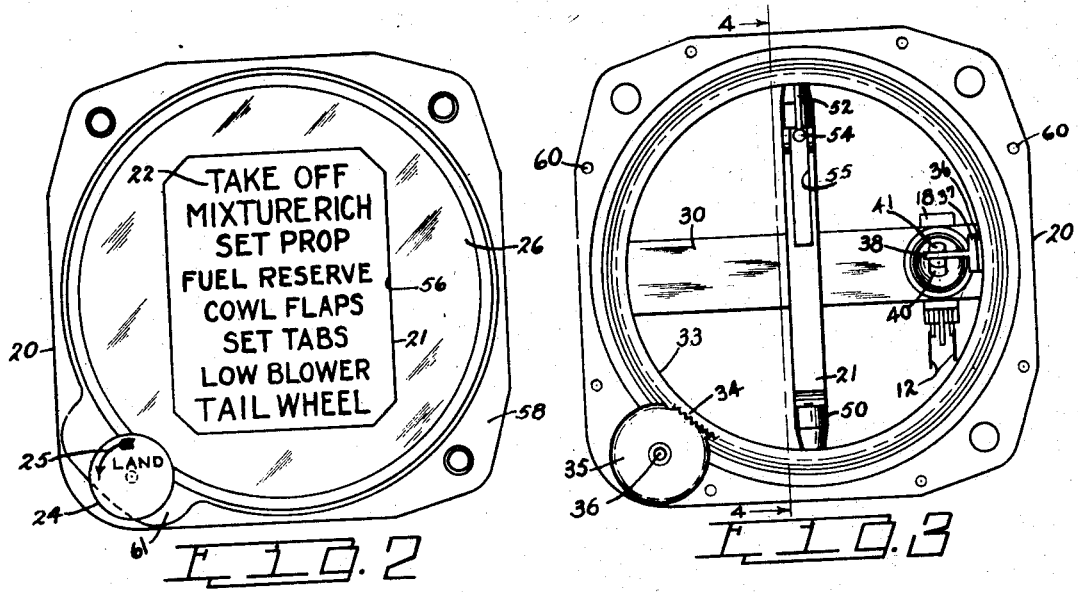
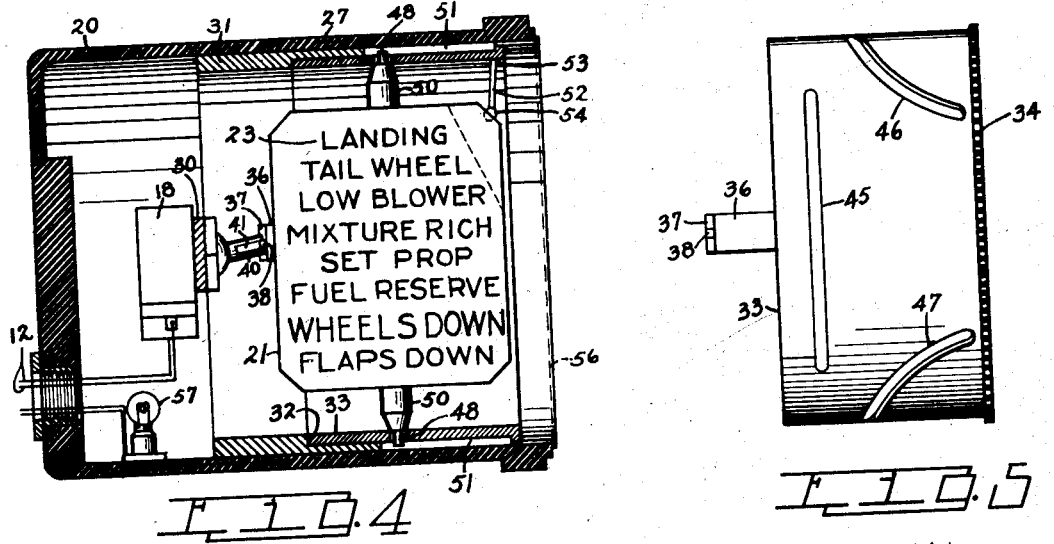
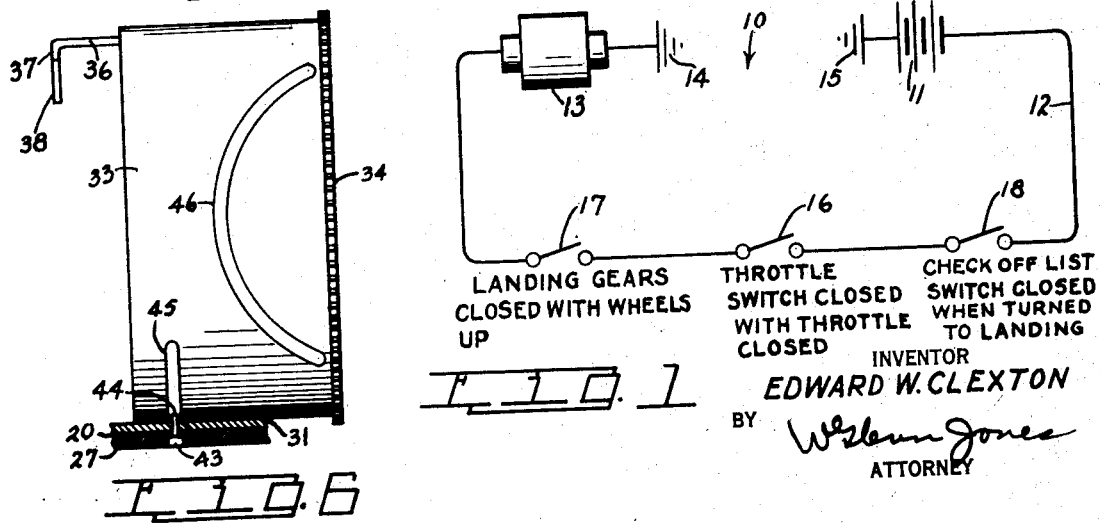
INVENTOR
EDWARD W. CLEXTON
BY
ATTORNEY Patented Nov. 18, 1941

2,262,756

UNITED STATES PATENT OFFICE 2,262,756

SAFETY DEVICE FOR USE ON AIRCRAFT EMPLOYING RETRACTABLE LANDING GEAR

Edward W. Clexton, United States Navy

Application May 8, 1940, Serial No. 334,092

5 Claims. (Cl. 177—311)

(Granted under the act of March 3, 1883, as amended April 30, 1928; 370 O. G. 757)

This invention relates to a safety device for use on aircraft employing retractable landing gear, and has for an object to provide a circuit for actuating a warning device to warn the pilot that the retractable wheels are not extended only when the pilot is about to land, and to prevent the warning signal being falsely actuated at any other time, as for instance when the throttle is closed during formation flight, dive bombing, fighting, etc.

With the present well-known system a warning device or howler is actuated by a switch which is closed when the throttle is closed in a circuit operating through another switch which remains closed while the landing wheels are in retracted position.

With the present device it is the theory that when the pilot is about to land he operates the landing gears to extend the wheels and closes the throttle as he approaches his landing position. Should he fail to operate the landing gears, the closing of the throttle switch completes the circuit to the howler, thereby reminding the pilot that he should operate his landing gears and thus disconnect the circuit to the howler.

In operation, however, especially in military planes, it is often necessary to close the throttle at many other times when it is not desired to land, as, for instance, in dive bombing, in formation flying, in fighting, or any other types of aerial acrobatics. With the present system, the howler or indicator is actuated each time the throttle is closed, so that after the pilot has been flying for some time he becomes so psychologically conditioned that he ignores the howler or warning indicator during such aerial acrobatics. However, it has been found in actual practice that such habit of ignoring the howler or warning indicator when such warning is false, continues with the pilot so that he still ignores the howler or warning indicator when the warning is true, and there have been thus many landings attempted with the wheels in retracted position, thus damaging or wrecking the aircraft and injuring or killing the pilot.

With this invention, however, the howler or warning indicator is operable only when the pilot is about to land the aircraft and is not operable during any previous aerial acrobatics, as a result of which, the pilot does not become falsely conditioned into a habit of ignoring the indicator, but instead is conditioned into a habit of obeying the indicator which is actuated only when it should be obeyed.

Advantage is taken of the fact that in each particular aircraft, certain particular steps must be taken when getting ready to take off or fly the aircraft, and another series of steps must be taken when getting ready to land the aircraft. To be sure that each necessary step is taken, it is desirable to provide a printed list visible to the pilot, showing what particular steps must be taken for the particular aircraft when taking off, as well as when landing. With this invention, these particular steps are made up into two lists, one a take-off list and the other a landing list, with only one list visible to the pilot at all times. The pilot must take a positive action to make the desired list visible to him. The act of selecting the desired list causes this invention to become operative.

With the foregoing and other objects in view, the invention consists in the construction, combination and arrangement of parts hereinafter described and illustrated in the drawing, in which, Fig. 1 is a diagrammatic outline of the circuit of the invention;

Fig. 2 is a front plan view of the check-off instrument used with this invention, showing the take-off list in visible position;

Fig. 3 is a view similar to Fig. 2, with the window and mask removed and the list plate in intermediate position as it is being turned from one side to the other;

Fig. 4 is a sectional view on line 4—4 of Fig. 3;

Fig. 5 is a side elevational view of the geared operating cylinder; and

Fig. 6 is a top elevational view of Fig. 5.

There is shown in Fig. 1 the circuit 10 involving this invention. This circuit 10 includes a source of electrical energy as well as a battery 11, connected as at 12 by a conduit to a warning indicator or howler 13, which is grounded to the airplane framework as at 14, the battery being grounded as at 15. This circuit 10 is ordinarily provided with a throttle switch 16, which throttle switch 16 is normally open when the throttle is open and is closed by the act of closing the throttle. Also provided in the circuit 10 is a landing gear switch 17. This switch 17 normally remains closed while the landing wheels are retracted in flying position, and is opened to interrupt the circuit by the act of actuating the landing gears to extend the wheels to landing position.

As thus far disclosed the circuit is conventional. It is obvious that the warning indicator or howler 13 is actuated only while the throttle is closed with the landing wheels in retracted position, thus warning the pilot to extend his landing wheels when he has closed the throttle preparatory to landing. However, with this type of circuit the howler will be unnecessarily actuated if the throttle switch is closed for any other reason.

This invention provides a third switch 18 in the circuit 10. This third switch 18 is a check-off list switch and is actuated in combination with and by a check-off list instrument 20, which is shown in Figs. 2 to 6, inclusive. This check-off list instrument 20 includes a check-off list plate 21 having a "take-off" list 22 on one side of the plate 21 and a "landing" list 23 on the other side of the plate 21. This check-off list plate 21 is so connected to the switch 18 that the switch 18 is in circuit interrupting or open position when the take-off list is visible to the pilot, and the switch 18 is in circuit completing position when the landing list 23 is visible to the pilot.

When the pilot is about to take off he rotates the control knob 24 in a clockwise direction and makes the take-off list 22 visible to him, which simultaneously opens the switch 18 to circuit interrupting position. He then leaves the take-off list 22 visible to him throughout the flight until he is ready to land, thus interrupting the circuit to the howler or indicator 13, irrespective of the position of the throttle switch 16. When about to land he rotates the control knob 24 counter-clockwise, as shown by the arrow 25, to make the landing list 23 visible to him through the instrument window 26. This simultaneously actuates the switch 18 to circuit-completing position, the landing list 23 thereby reminding the pilot what steps are to be taken preparatory to landing. Should he then close his throttle and thus close his throttle switch 16 before he has operated the landing gears to extend his landing wheels, the switch 17 being in closed position with the landing wheels in retracted position, the circuit 10 will be completed and the howler 13 will immediately operate to remind the pilot that he must extend his landing wheels.

The check-off instrument 20 shows one convenient way of connecting up the check-off plate 21 to the switch 18 in circuit 10.

As shown in Figs. 2 to 6, this check-off instrument 20 includes a housing 27 having a suitable opening 28 through which the conduit 12 extends to the switch 18 mounted on a cross bar 30, fixed in a cylinder 31, which cylinder 31 is sweated or otherwise secured immovably within the housing 27. This cylinder 31 is counterbored as at 32 and provides a trackway for rotatable sleeve 33. Secured to the forward end of the rotatable sleeve 33 is a gear ring 34 which meshes with a gear wheel 35 on a shaft 36, the control knob 24 being mounted on the shaft 36, whereby rotation of the control knob 24 in one direction or another correspondingly rotates the gear sleeve 33. Internally extending from the rear of the sleeve 33 is an arm 36 having a bent end 37 from which extends a finger 38.

The switch 18 includes a bifurcated tumbler arm 40 having a slot 41 so positioned, as shown in Fig. 3, that rotation of the sleeve 33 causes the finger 38 to enter the slot 41 of the bifurcated arm 40 and actuate the bifurcated tumbler arm 40 and open or close the switch 18, depending upon its direction of rotation; that is, the path of the finger 39 is such that it enters the slot 41, tumbles it, and then leaves the slot 41 as the sleeve 33 is rotated in either direction.

Smooth rotation of the sleeve 33 is insured by its having its inner edge sliding on the counterbore shoulder 32 of the fixed cylinder 31. A stud pin 42 may extend through the housing 27 and through the counterbored portion of the cylinder 31, holding the sleeve 31 against accidental axial rotation and having a guide pin 44 extending beyond the cylinder 31 into a quarter circumferential slot 45 in the sleeve 33 to permit rotation of sleeve 33, but prevent axial movement of sleeve 33.

A pair of half-moon shaped slots 46 and 47 at the top and bottom of sleeve 33 provide trackways for pivot shaft ends 48 extending through hubs 50 from the check-off plate 21. The cylinder 31 is provided at its top and bottom with two parallel axially extending slots 51 into which the pivot shaft ends 48 extend after passing through the half-moon shaped slots 46 and 47. A headed guide pin 52 fixed as at 53 in the sleeve 33 has a ball head 54 extended into a guiding slit 55 in the check-off plate 21.

A mask 56 set into the edge of the housing 27 is held slightly spaced from the take-off list 22 so as to provide a reflecting flange for any suitably mounted lighting bulb 57 within the housing 27 to provide indirect lighting of the take-off list at night. Next, the window 26 and a frame 58 are secured to the edge of the housing as by suitable screws 60, the control shaft 36 extending through a suitable flange 61 in the frame 58 before the control knob 25 is attached thereto.

With the instrument as thus described rotation of the control knob 25 in one direction or the other causes rotation of the sleeve 33 through the gears 35 and 34, the rotation of the sleeve 33 being limited by the length of its slot 45 into which the pin 44 extends. As the sleeve rotates the pivot shaft ends 48 travel in half-moon slots 46 and 47 and are caused by means of the axially extending slots 51 in fixed cylinder 31 to move axially from the window 26 back into the housing 27 as the half-moon slots 46 and 27 reach their furthermost point and then forwardly again as the shaft ends 48 reach the other ends of the half-moon slots 46 and 47. Meantime the head 54 of the headed pin 52 moves within the guide slot 55 of the plate 21, whereby the plate 21 by rotation of knob 24 is caused to present either the take-off list 22 or the landing list 23 through the window. Simultaneously, as already described above, the switch 18 is actuated to open position when the take-off list 22 is visible and to closed position when landing list 23 is visible, thus placing the circuit 12 in suitable condition for actuating the howler 13 only when the pilot gets ready to land and has made the landing list 23 visible, and not otherwise.

Other modifications and changes in the number and arrangement of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

I claim:

1. A safety device for use on aircraft employing retractable landing gear, comprising in combination a check-off list means operable to a landing list position or a take-off list position, a warning indicator, a source of electrical energy to said warning indicator, a circuit connecting said warning indicator to said source of electrical energy, a landing gear switch interrupting said circuit with the wheels in extended position, a throttle switch interrupting said circuit when the throttle is in closed position, and a manually operable check-off list switch interrupting said circuit except when the check-off list means has been manually actuated to the landing list position.

2. A safety device for use on aircraft employing retractable landing gear, comprising in combination a check-off list means operable to a landing list position or a take-off list position, a warning indicator, a source of electrical energy to said warning indicator, a circuit connecting said warning indicator to said source of electrical energy, a landing gear switch interrupting said circuit with the wheels in extended position, a throttle switch interrupting said circuit when the throttle is in closed position, a check-off list switch interrupting said circuit except when the check-off list means has been actuated to the landing list position, and manually operable means for selecting one of the check-off lists and simultaneously actuating the check-off list switch.

3. In a safety device for use on aircraft employing retractable landing gear and having a warning indicator, a source of electrical energy to said warning indicator, a circuit connecting said warning indicator to said source of electrical energy, a landing gear switch interrupting said circuit when the wheels are in extended position, a throttle switch interrupting said circuit when the throttle is in closed position, a check-off list means manually operable to either a landing list position or a take-off list position, and a check-off list switch interrupting said circuit except when the check-off list means has been manually actuated to the landing list position.

4. In a safety device for use on aircraft employing retractable landing gear and having a circuit to a warning indicator including a throttle switch and a landing gear switch; a check-off list switch means in the warning indicator circuit, said check-off list switch means comprising in combination a check-off list instrument, a check-off list plate rotatably mounted in said instrument, said check-off list plate having a landing list on one face thereof and a take-off list on the opposite face thereof, a switch in said instrument, and manually controllable means for rotating said check-off list plate to either landing list exhibiting position or take-off list exhibiting position, said manually controllable means including means to actuate said switch to circuit-interrupting position when said check-off list plate is moved to take-off list exhibiting position, and to actuate said switch to circuit-completing position when said check-off list is moved to landing list position.

5. A combined check-off list indicating instrument and switch for the purpose disclosed comprising a check-off list instrument, a check-off list plate rotatably mounted in said instrument, said check-off list plate having a landing list on one face thereof and a take-off list on the opposite face thereof, a switch in said instrument, and manually controllable means for rotating said check-off list plate to either landing list exhibiting position or take-off list exhibiting position, said manually controllable means including means to actuate said switch to circuit-interrupting position when said check-off list plate is moved to take-off list exhibiting position, and to actuate said switch to circuit-completing position when said check-off list is moved to landing list position, said manually controllable means comprising a cylinder within said instrument, a sleeve rotatably mounted in said cylinder, a pair of oppositely disposed axially extending slots in said cylinder, a pair of oppositely disposed half-moon shaped slots in said sleeve, a shaft extending through said check-off list plate and having its ends extending through said half-moon shaped slots into said axially extending slits, a headed guide pin mounted in said sleeve, said check-off list plate having a guide slot into which said guide pin extends, a switch operating arm extending from said sleeve, and manual means for rotating said sleeve within said cylinder to cause the check-off list plate shaft ends to travel in said slots and cooperate with the headed guide pin to rotate said check-off list plate from one side to the other and simultaneously actuate said switch.

EDWARD W. CLEXTON.